(12) United States Patent
Kish

(10) Patent No.: US 6,488,464 B1
(45) Date of Patent: *Dec. 3, 2002

(54) VEHICLE RESTRAINT WITH VERTICAL FLOAT

(75) Inventor: John A. Kish, Grafton, WI (US)

(73) Assignee: Rite Hite Holding Corporation, Milwaukee, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/558,520

(22) Filed: Apr. 26, 2000

(51) Int. Cl.[7] .......................... B65G 67/02; B65G 69/00
(52) U.S. Cl. .................................................. 414/401
(58) Field of Search ......................................... 414/401

(56) References Cited

U.S. PATENT DOCUMENTS

| | | | |
|---|---|---|---|
| 4,443,150 A | 4/1984 | Hahn et al. ................. | 414/401 |
| 4,488,325 A | 12/1984 | Bennett et al. .............. | 14/71.3 |
| 4,674,941 A | * 6/1987 | Hageman .................... | 414/401 |
| 4,759,678 A | 7/1988 | Hageman .................... | 414/401 |
| 4,830,563 A | 5/1989 | Yeakle ........................ | 414/401 |
| 4,861,217 A | * 8/1989 | Erlandsson ................. | 414/401 |
| 4,915,568 A | * 4/1990 | West .......................... | 414/401 |
| 4,938,647 A | * 7/1990 | Erlandsson ................. | 414/401 |
| 4,946,330 A | * 8/1990 | Pedersen et al. ............ | 414/401 |
| 5,297,921 A | 3/1994 | Springer et al. ............ | 414/401 |
| 5,702,223 A | 12/1997 | Hahn et al. ................. | 414/401 |

FOREIGN PATENT DOCUMENTS

RU     1244071    * 7/1986          414/401

* cited by examiner

*Primary Examiner*—Steven A. Bratlie
(74) *Attorney, Agent, or Firm*—Marshall, Gerstein & Borun

(57) ABSTRACT

A vehicle restraint at a loading dock includes a vertically moving barrier that engages a truck's rear ICC bar to help prevent the truck from accidentally moving too far away from the face of the dock. The restraint includes an inclined barrier actuator with minimal linkage that provides a low-profile stored position. The barrier actuator powers the barrier up to engage the ICC bar and powers the barrier down to a stored position. A compliant coupling provides the barrier with vertical float to allow for incidental vertical movement of the ICC bar, as the truck is being loaded or unloaded of its cargo. The restraint also includes a novel switch actuator that senses whether the ICC bar is properly positioned relative to the barrier.

32 Claims, 6 Drawing Sheets

VEHICLE RESTRAINT WITH VERTICAL FLOAT

BACKGROUND OF THE INVENTION

1. Field of the Invention

The subject invention generally pertains to a vehicle restraint that engages a truck's rear ICC bar to help prevent the truck from accidentally pulling away from a loading dock and more specifically to a vehicle restraint that responds to vertical movements of the truck, as the truck is being loaded or unloaded of its freight.

2. Description of Related Art

When loading or unloading a truck parked at a loading dock, it is generally a safe practice to help restrain the truck from accidentally moving too far away from the dock. This is often accomplished by a hook-style vehicle restraint that engages what is often referred to in the industry as an ICC bar or a Rear Impact Guard (RIG). An ICC bar or RIG is a bar or beam that extends horizontally across the rear of a truck, below the truck bed. Its primary purpose is to help prevent an automobile from under-riding the truck in a rear-end collision. However, an ICC bar also provides a convenient structure for a hook-style restraint to reach up in front of the bar to obstruct the bar's movement away from the dock. To release the truck, many restraints lower to a stored position below the bar, which then allows the next truck to back into the dock. Other hook-style restraints store in a normally raised position and include an inclined lead-in that an ICC bar uses to help push the restraint underneath the bar as the truck backs into the dock, as disclosed in U. S. Pat. Nos. 5,702,223; 4,443,150; and 4,938,647. Once underneath the bar, usually a barrier rises in front of the bar (e.g., rotates to such a position) to restrain the truck.

Current hook-style vehicle restraints provide a wide variety of advantages and features. Some restraints have a sensor or switch intended for determining whether the hook or barrier is properly positioned to obstruct the ICC bar, as disclosed in U.S. Pat. No. 4,759,678. However, in the '678 device, an ICC bar catching the very distal end of the restraint carriage (i.e., just in front of the hook) would appear to allow the hook to rise and trip the switch to indicate that the ICC bar was restrained, when actually the bar would be in front of the hook. This problem is avoided by the restraints of U. S. Pat. Nos. 4,488,325 and 5,297,921, which include switches that more directly sense the position of an ICC bar. However, these restraints, as well as the '678 restraint, have a significantly high vertical profile in their lowered, stored positions. The high profile may prevent some especially low ICC bars from passing over the top of the restraint, even when the restraint is lowered to its stored position.

Further, to move a restraint barrier or hook, often a complicated linkage (for various reasons) is employed to raise or lower the barrier under the power of an actuator, as disclosed in U. S. Pat. Nos. 4,861,217; 4,674,941; and 4,830,563. Although the linkages may provide some benefit, their relative complexity can add to their maintenance and cost.

It is usually desirable for a restraint to allow for some vertical movement of the ICC bar, which is often caused by weight being added or removed from the truck (and thus the suspension) while at the loading dock. The changes in weight can be due to cargo being added or removed, and/or can be due to a forklift driving on and off the truck bed. For truck beds with rear air suspension, an ICC bar may move up and down several inches. If the barrier does not rise with the bar, the bar may rise up and over the barrier, thus limiting the truck's resistance to movement away from the dock face. If the barrier does not descend when the weight of the truck forces the ICC bar down, the immoveable barrier might bend the bar under the truck's added weight.

To allow for incidental vertical movement of a truck's ICC bar, many vehicle restraints employ pneumatic cylinders for moving the barrier. The compressibility of the air within the cylinder provides a gas spring effect that allows some movement of the barrier even when control valves of the pneumatic system trap the air within the cylinder. In some cases, however, there may be an advantage to using a motor-driven actuator or hydraulics, rather than pneumatics, for moving the barrier. For example, a hydraulically actuated vehicle restraint and a nearby hydraulically actuated dock leveler could perhaps share the same hydraulic pump, tank, and other hydraulic components. Sometimes, hydraulics is preferred over pneumatics to provide a more controlled rate of movement or to positively maintain the position of certain parts after the parts have stopped moving. Moreover, for a pneumatic system, a source of compressed air must be present.

Unfortunately, in applications where a motor-driven actuator or hydraulics is preferred, it can be difficult to provide a vehicle restraint that can allow for vertical movement of the ICC bar once the restraint's actuator has moved the barrier into position. Further, it can be difficult to provide a restraint that allows for vertical movement of an ICC bar without sacrificing other features of the restraint, such as a low vertical profile when in a lowered, stored position; minimal mechanical complexity; and a switch that ensures that an ICC bar is in position.

SUMMARY OF THE INVENTION

In order to provide a low-profile vehicle restraint, the restraint disclosed herein includes a vertically moveable barrier that is moved by an angled actuator from a lowered, stored position to a raised, operative position to obstruct an ICC bar, wherein the restraint allows for incidental vertical movement of the ICC bar after the barrier is at its raised, operative position.

In some embodiments of the restraint, the use of linkages is minimized to perhaps minimize maintenance and improve the reliability of the restraint.

In some embodiments, the restraint includes a compliant coupling that allows for incidental vertical movement of an ICC bar even when the length of a barrier actuator remains substantially constant.

In some embodiments, the compliant coupling can be disposed at either an upper or lower end of the barrier actuator.

In some embodiments, a piston/cylinder or a motor-driven actuator can move the barrier.

In some embodiments of the restraint, the force to vertically move the barrier is transmitted along a generally straight line between the barrier and a frame of the restraint to help provide a strong, reliable barrier/frame connection, and the line of force is inclined to reduce the vertical profile of the restraint when in its lowered, stored position.

In some embodiments, to reduce the vertical profile of the restraint when in its lowered, stored position, the actuator pivots as the barrier moves vertically.

In some embodiments, a pressure relief valve is used to allow for incidental vertical movement of an ICC bar.

In some embodiments, an accumulator is used to allow for incidental vertical movement of an ICC bar.

In some embodiments, the barrier is powered both up and down, rather than relying on spring force, horizontal movement of the truck, the weight of the barrier, or the weight of a trolley that carries the barrier to cause vertical movement.

In some embodiments, a vehicle restraint is provided with an ICC bar sensor that includes a switch actuator captured within the geometry of the restraint's hook to help protect the switch actuator from damage.

DESCRIPTION OF THE PREFERRED EMBODIMENT

Figure 1:
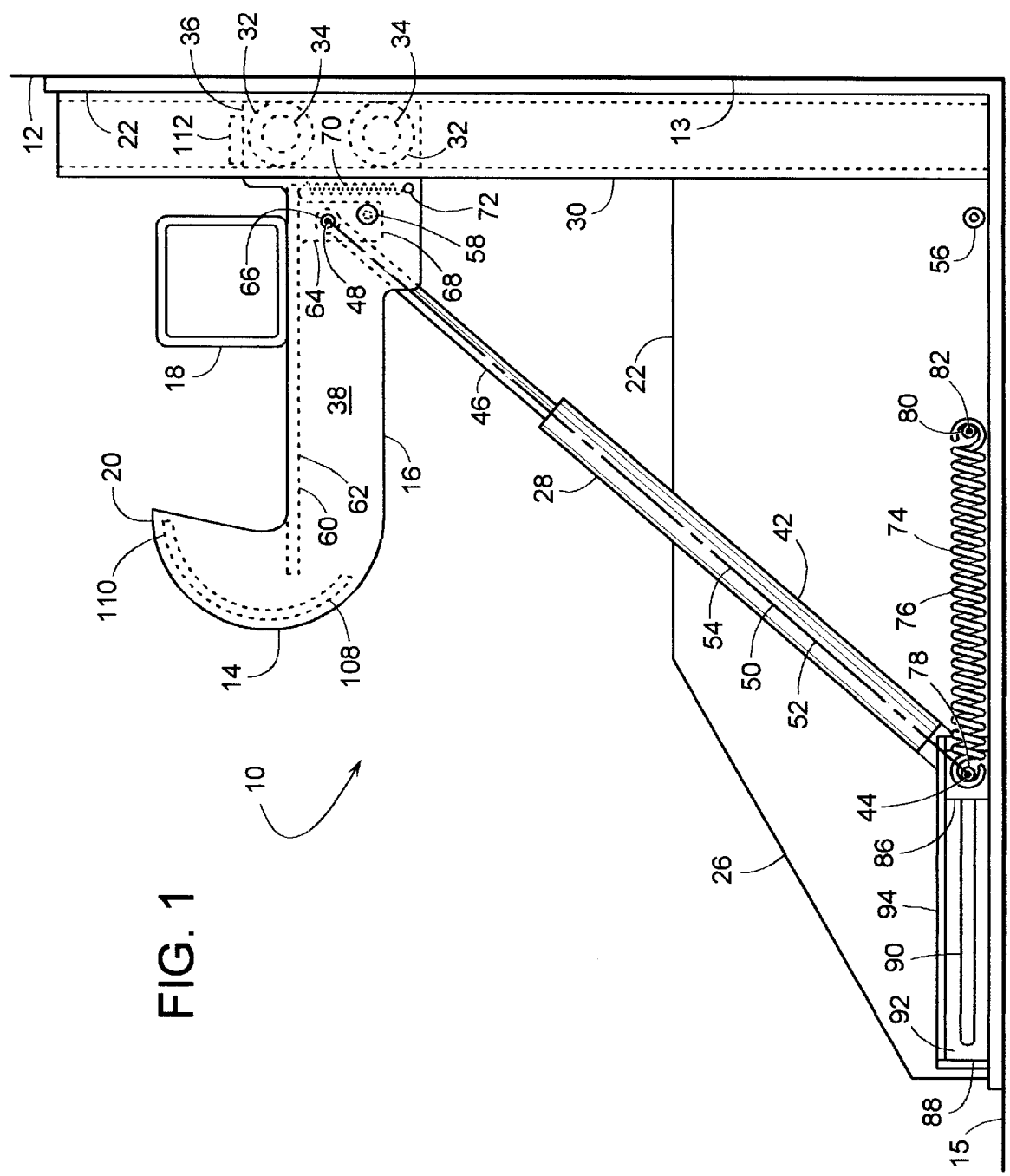
FIG. 1 is a side view of a vehicle restraint with one frame plate of the restraint omitted for clarity, and with a barrier of the restraint shown in a first operative position.
Figure 2:
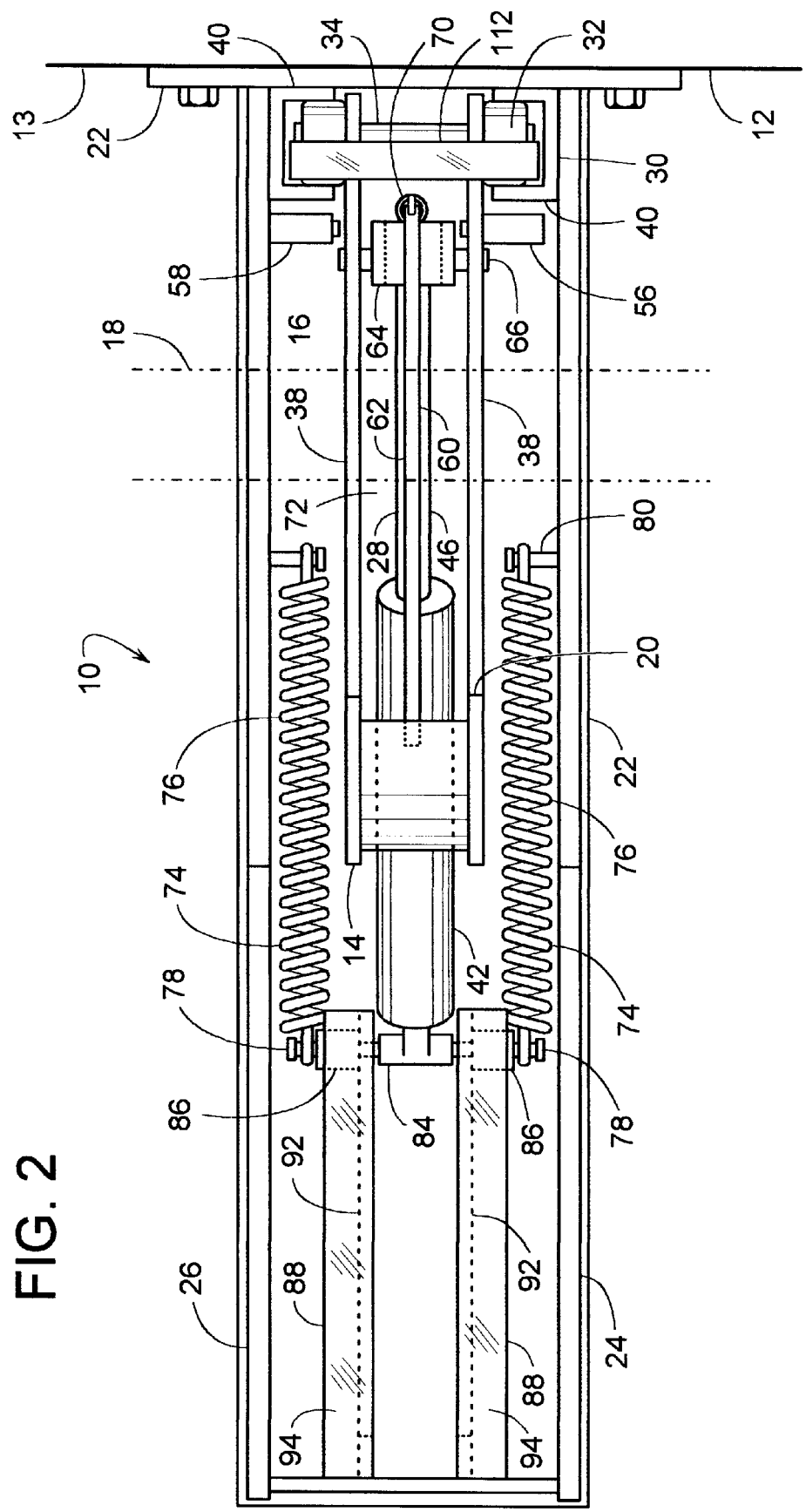
FIG. 2 is a top view of FIG. 1.
Figure 3:
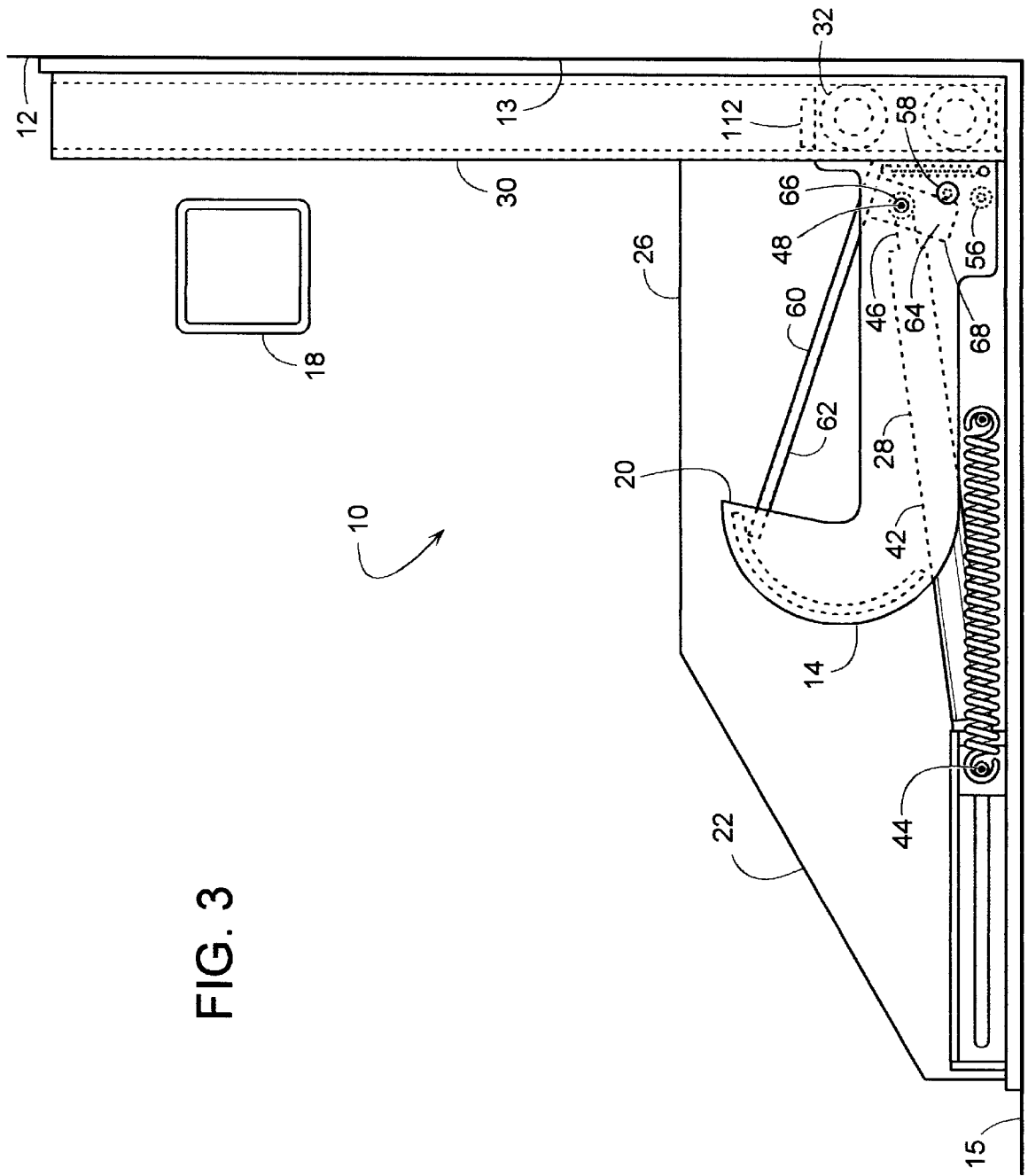
FIG. 3 is the same as FIG. 1, but with the barrier is a stored position.

A vehicle restraint 10 that can help prevent a truck from separating from a face 13 of a loading dock 12 is shown with a barrier 14 in a raised, operative position in FIGS. 1 and 2, and is shown with barrier 14 in a lowered, stored position in FIG. 3. In the operative position, a shank 16 of barrier 14 presses up against the underside of a truck's ICC bar 18, while a distal end 20 of barrier 14 helps limit the extent to which bar 18 can move away from dock face 13. In the stored position, of FIG. 3, distal end 20 of barrier 14 is below bar 18 to allow the truck to move away from dock 12 without being inhibited by restraint 10.

To fix restraint 10 against movement away from dock 12 and to help protect some of the restraint's components, restraint 10 includes a frame 22 that in a preferred embodiment includes two frame plates 24 and 26. Both frame plates 24 and 26 are shown in FIG. 2, but plate 24 is omitted in the rest of the drawing figures to more clearly show other features of the restraint.

To move barrier 14 between its operative and stored positions, an elongated member, such as a barrier actuator 28, moves barrier 14 along a generally vertical track 30 that is fixed relative to frame 22, a driveway 15, and dock face 13. The relative movement between barrier 14 and track 30 can be provided by any conventional track system that employs rollers, slides, or some other moving connection. In some embodiments, rollers 32 are attached to two shafts 34, which in turn are attached to a proximal end 36 of two hook-shaped side plates 38 of barrier 14. Rollers 32 can then roll within the confines of two channels 40 that face each other to comprise track 30. The flanges of channels 40 provide a bearing surface at each vertical position of barrier 14. That is, pull-out forces exerted on barrier 14 by a vehicle attempting to leave the dock while the restraint is engaged are reacted into dock face 13 through the rollers engaging track 30 which is in turn coupled to frame 22. In addition, track 30 forms a bearing surface to facilitate the barrier 14 moving vertically between its operative and stored positions. As will be clear from the discussion below, the actuator for raising the barrier 14 will exert forces thereon that have both horizontal and vertical components. Bearing engagement between rollers 31 and channels 40 (particularly the rear walls thereof) will restrict the barrier 14 from moving horizontally toward and away from the dock face 13, even when the applied forces have a horizontal component. The inner end of barrier 14 is thus guided vertically by this bearing arrangement. This vertical movement could also be characterized as "substantially linear" in the sense that the rollers at the inner end of the barrier move within an envelope having a width defined by the width of the track (its distance away from the dock face). Since the distance of the inner end of the barrier from the dock face does not vary significantly because of the engagement with the track, the movement is substantially vertical.

To provide the motive force for lifting barrier 14, a linear member (e.g., actuator 28) is coupled between barrier 14 and frame 22. The linear member includes a first end movably coupled to frame 22 and a second end movably coupled to barrier 14, such that the linear member can lean relative to a vertical reference line and assume a range of acute angles facing toward dock face 13 as barrier moves up and down. In some embodiments, the linear member may have a variable length, and itself be an actuator for providing the motive force to move barrier 14. In other embodiments, the linear member has a fixed length and is operatively coupled to an actuator for providing the motive force, which is then transferred by the linear member. In either case, the linear member includes a centerline that remains parallel to a line segment connecting the points where the two ends of the linear member are coupled to frame 22 and barrier 14, respectively. The presence of the linear member further provides that the load path along which the motive force for lifting barrier 14 is applied is a linear path, again extending between the coupling points of the linear member to frame 22 and barrier 14. The parallelism of the centerline of the linear member to the coupling points, and the presence of a linear load path distinguishes the embodiments shown herein from restraints in which a multi-component mechanical linkage transmits a barrier motive force between frame 22 and barrier 14. There, the load path necessarily follows the non-linear path established by the orientation of the components forming the linkage. The coupling of the linear member to the frame and barrier in such a way as to allow the member to assume a range of acute angles toward dock face 13 also distinguishes the restraint disclosed herein from those in which a vertically disposed linear actuator is used to raise the restraint barrier.

Returning to the restraint of FIGS. 1–5, the linear member is illustrated in the form of a variable-length actuator 28. Actuator 28 is schematically illustrated to represent any of a variety of actuators including, but not limited to, a hydraulic cylinder (i.e., a piston moveable within a cylinder to move a piston rod, wherein the term, "rod" encompasses any elongated member), a pneumatic cylinder, and an electromechanical actuator (e.g., a gear-motor driving a linearly extendible rod or elongated member). Here, actuator 28 includes a cylinder 42 having a first point 44 coupled to frame 22 and includes a piston rod 46 having a second point 48 coupled to barrier 14. In this embodiment, the coupling of first point 44 to frame 22 provides both pivotal and translational movement of the linear member or actuator relative to frame 22. Thus, the extension and retraction of rod 46 along its centerline 50 respectively raises and lowers barrier 14. As barrier 14 moves up and down, centerline 50 remains collinear with or parallel to a line 52 extending from point 44 to 48. Actuator 28 also provides a load path 54 along which a barrier-moving force is transmitted from 44 to 48, wherein centerline 50, line segment 52, and the center of load path 54 remain collinear as the barrier moves up and down.

To indicate when barrier 14 is in its stored position or at an operative position that effectively blocks the movement of bar 18, restraint 10 is provided with two limit switches 56 and 58. Switches 56 and 58 are schematically illustrated to encompass switches of a variety of styles including, but not limited to, lever-actuated switches, hall-effect proximity switches, photoelectric eyes, motor current sensors (sensing current to a motor-driven barrier actuator), resolver or encoder (sensing rotation of a motor-driven barrier actuator), piston sensor (sensing the position of a piston within a cylinder), pressure sensor (sensing the fluid pressure within a cylinder that moves barrier 14), and various combinations thereof. In some embodiments, switch 56 is a hall-effect proximity switch that attaches to frame 22 at a location where barrier 14 can trip switch 56 by lowering to its stored position, adjacent to switch 56.

Switch 58 can be attached to one side plate 38 of barrier 14 and can operate similar to switch 56, but work in conjunction with a switch actuator 60. In some embodiments, for example, switch actuator 60 comprises a rod 62 attached to an inverted U-shaped bracket 64. Rod 62 and bracket 64 pivot about a pin 66 that extends through the two side plates 38 of barrier 14 and through two downwardly extending tabs 68 of bracket 64. Pin 66, incidentally, also provides a convenient location for coupling piston rod 46 to barrier 14 at point 48. In the absence of an ICC bar, a spring 70 acting between bracket 64 and a fixed point 72 on barrier 14 pivots rod 62 clockwise (as viewed in FIG. 3). The pivotal motion extends rod 62 above shank 16 and moves at least one tab 68 or some other portion of switch actuator 60 away from switch 58, as shown in FIG. 3.

When barrier 14 rises against the underside of ICC bar 18, as shown in FIG. 1, the relative movement between barrier 14 and ICC bar 18 pivots rod 62 counterclockwise about pin 66. This causes rod 62 to pivot or retract below an upper surface of shank 16 and into a cavity 72 between side plates 38, which helps protect rod 62 from damage. The downward pivotal motion also causes one tab 68, or some other portion of switch actuator 60, to move to a position that trips switch 58, thus indicating that barrier 14 is in a position to block the movement of bar 18.

Feedback from switches 56 and 58 can be used in conjunction with conventional control circuitry (e.g., control relays, programmable logic controls, etc.) to simply operate one or more lights that indicate the position of barrier 14 relative to frame 22 and/or indicate the position of barrier 14 relative to ICC bar 18. Feedback from the switches can further be used in controlling the movement of barrier 14. For example, feedback from switch 56 can be used for automatically discontinuing the retraction of barrier actuator 28 upon barrier 14 reaching its lowered, stored position.

Figure 4:
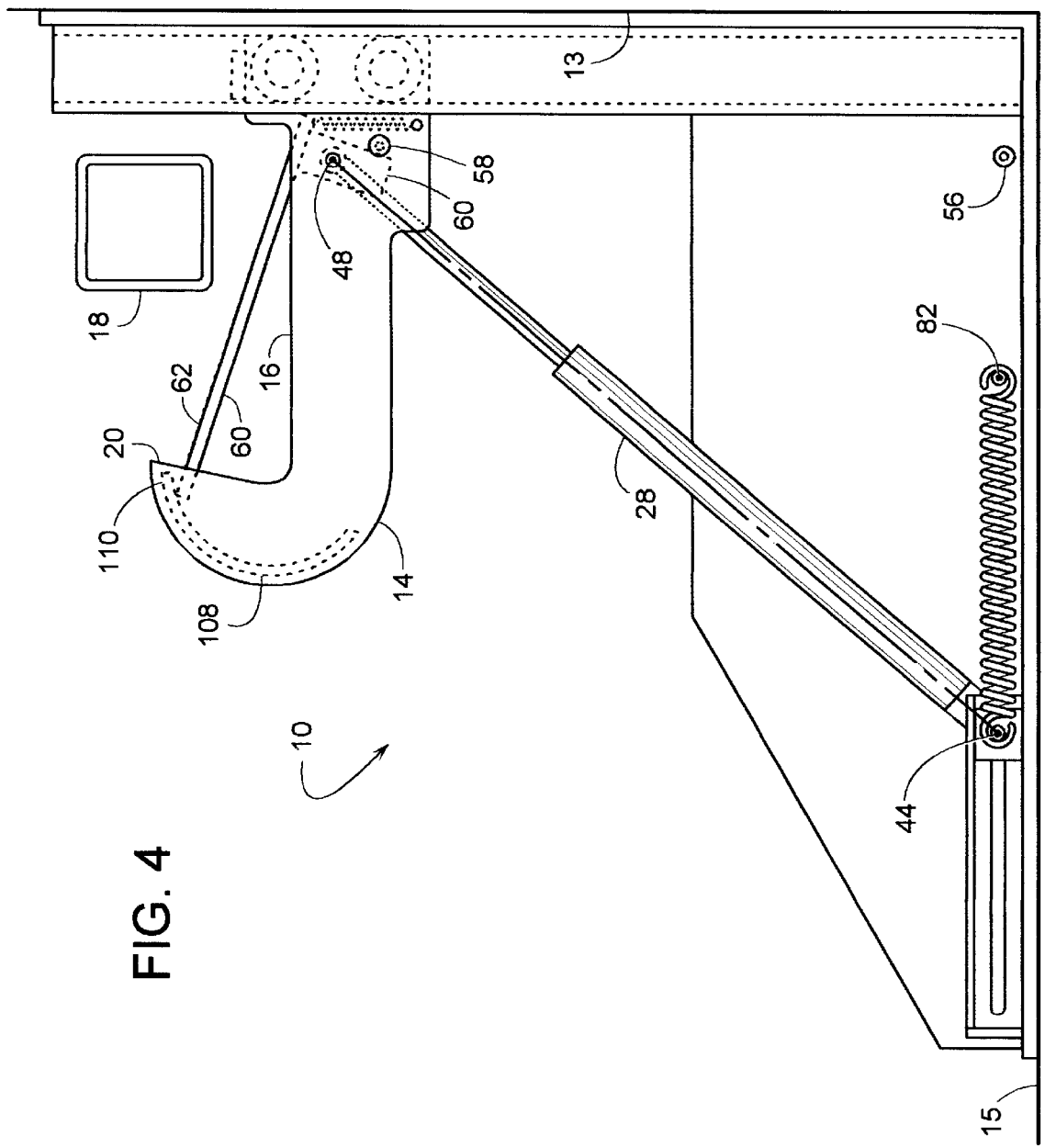
FIG. 4 is the same as FIG. 1, but with an ICC bar having moved upward.

If barrier 14 and ICC bar 18 were in the positions shown in FIG. 1, and bar 18 then rose to the position of FIG. 4 (e.g., due to weight being removed from the truck), feedback from switch 58 could serve as a signal that automatically causes actuator 28 to lift barrier 14 until switch actuator 60 trips switch 58 once again. Tripping switch 58 could stop the extension of barrier actuator 28 to keep distal end 20 above the underside of bar 18 without shank 16 exerting excessive force up against bar 18.

Figure 5:
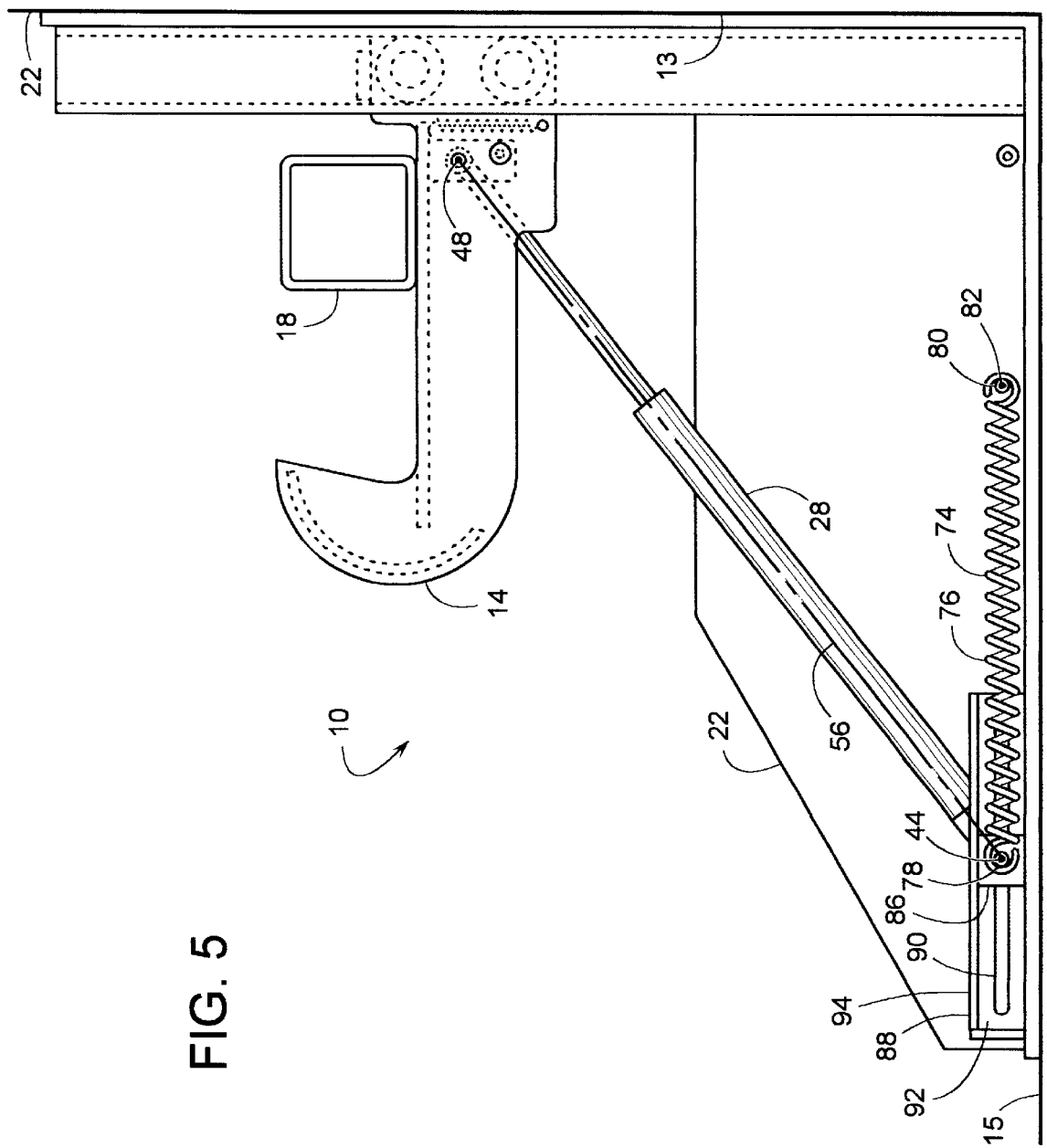
FIG. 5 is the same as FIG. 1, but with the ICC bar having moved the barrier down to a second operative position.

If weight is added to the truck, which forces ICC bar 18 down to a second operative position of FIG. 5, but barrier actuator 28 neither extends nor retracts (i.e., the length of line segment 52 defined by points 44 and 48 remains substantially constant), restraint 10 can still allow barrier 14 to descend with bar 18 by virtue of a compliant coupling 74. Such a coupling can be disposed at almost any location between barrier 14 and frame 22, including, but not limited to, being disposed somewhere along the length of actuator 28 or at either end of actuator 28, at point 44 or 48.

In a currently preferred embodiment, compliant coupling 74 is disposed at point 44. In this example, coupling 74 includes one or more springs 76 stretched between one pin 78 at point 44 and a second pin or anchor 80, which is fixed at a third point 82 relative to frame 22. Pin 78 also extends through a trunnion 84 at the lower end of cylinder 42, and preferably extends through one or more guide blocks 86. A lower track 88 includes a slot 90 along which pin 78 travels and includes a side flange 92 and a top flange 94 that help guide the movement of block 86. Thus, as ICC bar 18 forces barrier 14 down (from the first operative position of FIG. 1 to a second operative position of FIG. 5), the length of actuator 28 (i.e., the length of line segment 52) remains generally constant; point 48 moves down; and point 44, pin 78, and block 86 move horizontally to the left, as viewed in FIG. 5. Both points 44 and 48 move relative to point 82. The horizontal movement of pin 78 stretches spring 76 to maintain some upward pressure against ICC bar 18. If bar 18 later returns to its position of FIG. 1, spring 76 pulling on pin 78 causes actuator 28 to keep barrier 14 pressed up against bar 18.

Figure 6:
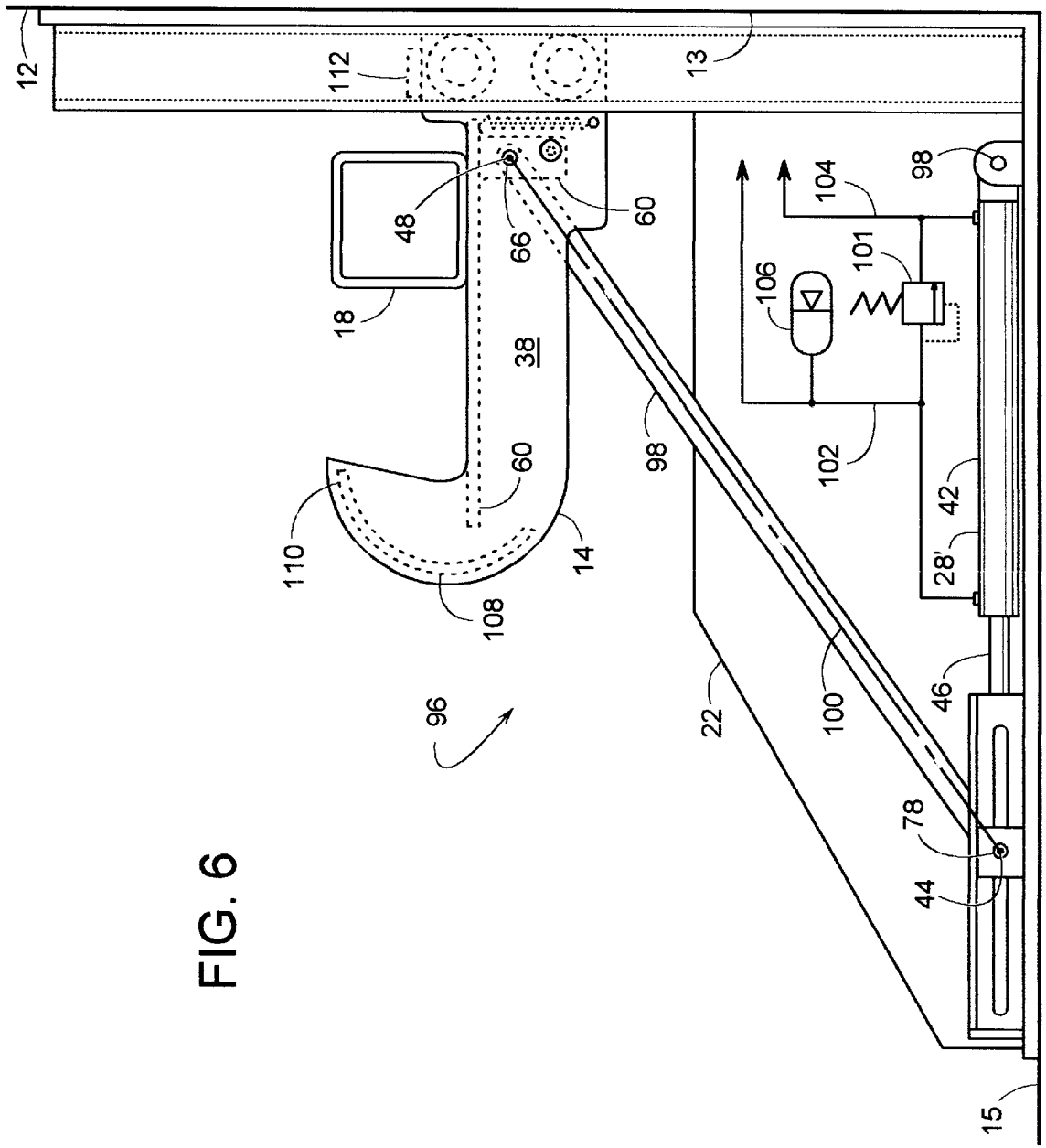
FIG. 6 is similar to FIG. 1, but of another embodiment of a vehicle restraint.

In an alternate vehicle restraint 96, barrier 14 is moved by an elongated member, such as a fixed-length linear member 98 that is pinned between pins 66 and 78 and is tilted or leaning at an angle from vertical, in order to assume a range of acute angles facing toward dock face 13 as barrier 14 moves up and down, as shown in FIG. 6. An actuator 28' is pinned between a fixed pin 98 and pin 78 and lies generally horizontally. To raise barrier 14, actuator 28' retracts to move pin 78 to the right (as viewed in FIG. 6) and pin 66 upward. To lower barrier 14, actuator 28 extends to move pin 78 to the left (again, as viewed in FIG. 6) and pin 66 downward. Member 98 provides a generally linear load path 100 and a fixed length connection between points 44 and 48 that remains collinear with a line connecting points 44 and 48 as barrier 14 moves up and down.

Once in the position of FIG. 6, additional incidental upward movement of ICC bar 18 may release switch actuator 60, which causes barrier 14 to rise in a manner similar to that of restraint 10.

To allow for some forced downward movement of ICC bar 18, a pressure relief valve 101 and/or a gas-charged accumulator 106 can be hydraulically coupled to cylinder 42, as shown in FIG. 6. Relief valve 101 connects a line 102 leading to the rod end of cylinder 28 to a second line 104 leading to the cylinder end or opposite side of the piston. A hydraulic system (one dedicated to restraint 96 or one associated with a nearby dock leveler) selectively pressurizes lines 102 and 104 to extend and retract rod 46, thereby respectively lowering and raising barrier 14. When the weight of a truck forces its ICC bar 18 down, link 98 urges cylinder rod 46 to extend, which builds pressure in line 102. If the pressure exceeds a predetermined limit, relief valve 101 opens, which allows rod 46 to extend, which in turn allows barrier 14 to descend. As an alternative, or in addition to valve 101, accumulator 106 can be connected to line 102. Now, if ICC bar 18 exerts excessive downward force against barrier 14, the resulting buildup of pressure in line 102 can compress the gas in accumulator 106. Accumulator 106 taking on hydraulic fluid from line 102 allows piston rod 46 to extend a limited distance to lower barrier 14.

It should be noted that the hydraulic circuit comprising lines 102 and 104, valve 101, and accumulator 106 is schematically illustrated in FIG. 6. The schematic is not intended to show the physical locations of each component, as the components can be positioned almost anywhere. Likewise, cylinder 42 does not necessarily have to be mounted horizontally with rod 46 pointing away from dock face 13. Cylinder 42 could be mounted in various other positions and still act between point 44 and another point fixed relative to frame 22.

Although the actual structure of barrier 14 can vary, in preferred embodiments barrier 14 includes several features that provide restraints 10 and 96 with strength and durability. For example, a curved member 108 welded between side plates 38 not only strengthens barrier 14, but an upper tip 110 of member 108 prevents rod 60 from extending above distal end 20 of barrier 14 (see FIG. 4). Keeping switch actuator 60 contained within the envelope of barrier 14 helps protect rod 62 from damage. When a truck attempts to pull away from dock 22 while barrier 14 is restraining the truck's ICC bar, an upper bar 112 welded across the tops of side plates 38 is adapted to engage track channels 40. Bar 112 engaging channels 40 helps counteract the trucks excessive pullout force, thus reducing the load on rollers 32.

Although the invention is described with reference to a preferred embodiment, it should be appreciated by those skilled in the art that various modifications are well within the scope of the invention. Therefore, the scope of the invention is to be determined by reference to the claims that follow.

I claim:

1. A vehicle restraint, comprising:
   a frame;
   a track;
   a barrier moveable upwardly relative to the frame from a stored position to a first operative position, barrier movement being guided within a bearing engagement to the track; and
   an elongated member extending between a first point coupled to the frame at a substantially constant elevation and a second point coupled to the barrier for movement therewith, wherein the first point and the second point define a line leaning from vertical at each vertical position of the barrier.

2. The vehicle restraint of claim 1, wherein the elongated member has a variable length to vary the distance between the first point and the second point.

3. The vehicle restraint of claim 1, wherein the elongated member has a substantially fixed length between the first point and the second point.

4. The vehicle restraint of claim 1, wherein the elongated member is directly connected to the barrier by way of a pin about which the elongated member can rotate relative to the barrier.

5. The vehicle restraint of claim 1, wherein the elongated member is pivotal relative to the frame.

6. The vehicle restraint of claim 1, wherein the first point is coupled to a guide in the frame for movement in at least a horizontal direction.

7. The vehicle restraint of claim 1, wherein the barrier is further moveable from the first operative position to a second operative position, and further comprising a compliant coupling attached to the elongated member and associated with a third point such that the barrier is moveable between the first operative position and the second operative position by virtue of, at least, the first point being moveable relative to the third point.

8. The vehicle restraint of claim 7, wherein the third point is substantially fixed relative to the frame.

9. The vehicle restraint of claim 7, wherein the compliant coupling is a spring.

10. The vehicle restraint of claim 1, further comprising a switch moveable with the barrier and alternately triggers and terminates movement of the barrier.

11. The vehicle restraint of claim 10, wherein the switch includes a switch actuator that is pivotally relative to the barrier.

12. The vehicle restraint of claim 11, wherein the barrier includes a proximal end, a distal end and a shank therebetween; wherein the distal end is higher than the shank, the proximal end is mounted for vertical movement along the track, and a portion of the switch actuator is adapted to alternately retract within and extend above a cavity defined by the shank.

13. The vehicle restraint of claim 1, further comprising a barrier actuator coupled to the frame and the first point of the elongated member and being able to extend and retract to move the barrier.

14. The vehicle restraint of claim 13, further comprising an accumulator associated with the barrier actuator.

15. The vehicle restraint of claim 13, further comprising a pressure relief valve associated with the barrier actuator.

16. The vehicle restraint of claim 6, wherein the guide and the track together have an L-shape orientation.

17. A vehicle restraint, comprising:
   a frame;
   a track coupled to the frame for defining a bearing surface;
   a barrier movable relative to the frame between a stored position and a first operative position, the barrier having a movement guided by the track; and
   a barrier actuator having a first end and a second end, and a varying length therebetween, the second end being coupled to the barrier and the first end being coupled to the frame such that the bearing surface opposes any horizontal force applied on, at least, the second end, with the first end and the second end defining a line leaning from vertical at a each vertical position of the barrier.

18. The vehicle restraint of claim 17, wherein the barrier actuator includes a piston moveably disposed within a cylinder.

19. The vehicle restraint of claim 17, wherein the barrier actuator is pivotal relative to the frame.

20. The vehicle restraint of claim 17, wherein the barrier is further moveable from the first operative position to a second operative position, and further comprising a compliant coupling attached to the barrier actuator and being associated with a third point such that the barrier is moveable between the first operative position and the second operative position by virtue of both the first end and the second end being moveable relative to the third point even when the length of the barrier actuator remains substantially constant.

21. The vehicle restraint of claim 20, wherein the barrier is moveable between the first operative position and the second operative position by further virtue of the first end being moveable in a direction having a horizontal component.

22. The vehicle restraint of claim 20, wherein the third point is substantially fixed relative to the frame.

23. The vehicle restraint of claim 20, wherein the compliant coupling is a spring.

24. The vehicle restraint of claim 17, further comprising a switch moveable with the barrier and alternately triggers and terminates movement of the barrier.

25. The vehicle restraint of claim 24, wherein the barrier includes a proximal end, a distal end and a shank therebetween; wherein the distal end is higher than the shank, the proximal end is mounted for vertical movement along the track, and a portion of the switch actuator is adapted to alternately retract within and extend above a cavity defined by the shank.

26. The vehicle restraint of claim 24, wherein the switch includes a switch actuator that is pivotal relative to the barrier.

27. A vehicle restraint, comprising:
   a frame;
   a track;
   a barrier movable relative to the frame between a stored position and a first operative position;
   at least, one elongated member extending between a first point coupled to the frame and a second point coupled to the barrier with the first point and the second point defining a line leaning from vertical; and
   a barrier actuator coupled to the first point, wherein the barrier actuator moves the first point along a substantially linear first path such that the second point moves along a substantially linear second path substantially orthogonal to the first path to move the barrier between its stored position and its first operative position.

28. The vehicle restraint of claim 27, wherein the elongated member is directly connected to the barrier by way of a pin about which the elongated member can rotate relative to the barrier.

29. The vehicle restraint of claim 27, further comprising an accumulator associated with the barrier actuator.

30. The vehicle restraint of claim 27, further comprising a pressure relief valve associated with the barrier actuator.

31. A vehicle restraint, comprising:
   a frame;
   a track;
   a barrier moveable relative to the frame between a stored position and a first operative position; and
   an elongated member having a translating first point coupled to the frame at a constant elevation and a translating second point coupled to the barrier to provide a linear load path therebetween and along which a force is transmitted at an incline to move the barrier parallel to the track to the first operative position.

32. The vehicle restraint of claim 31, wherein the elongated member is directly connected to the barrier by way of a pin about which the elongated member can rotate relative to the barrier.

* * * * *

UNITED STATES PATENT AND TRADEMARK OFFICE
CERTIFICATE OF CORRECTION

PATENT NO.   : 6,488,464 B1
DATED        : December 3, 2002
INVENTOR(S)  : Kish

It is certified that error appears in the above-identified patent and that said Letters Patent is hereby corrected as shown below:

<u>Column 3,</u>
Line 17, please delete "with the barrier is a stored position" and insert -- with the barrier in a stored position --.

<u>Column 8,</u>
Line 42, please delete "at a each vertical position" and insert -- at each vertical position --.

Signed and Sealed this

Ninth Day of December, 2003

JAMES E. ROGAN
*Director of the United States Patent and Trademark Office*